INVENTOR
ROBERT M. KEE
BY Vernon F. Hauschild
ATTORNEY

Aug. 1, 1967  R. M. KEE  3,333,642
HELICOPTER BLADE OR BLADE SPAR CONSTRUCTION
Filed July 26, 1965  7 Sheets-Sheet 4
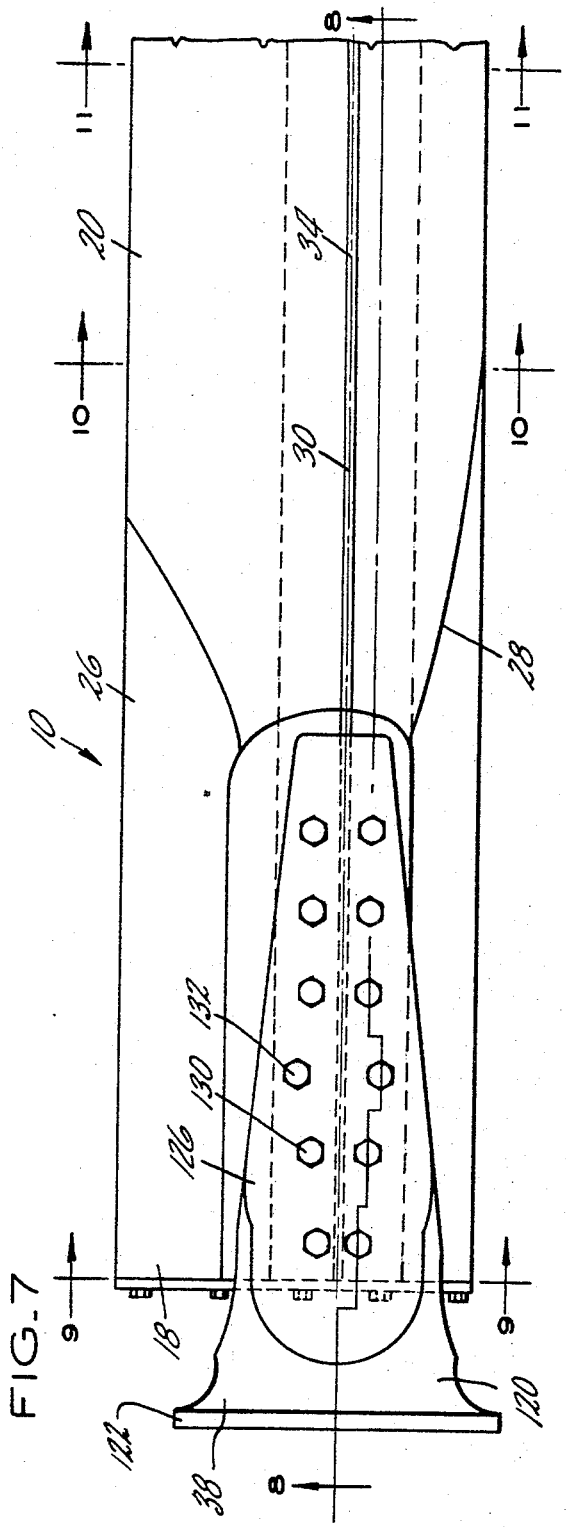
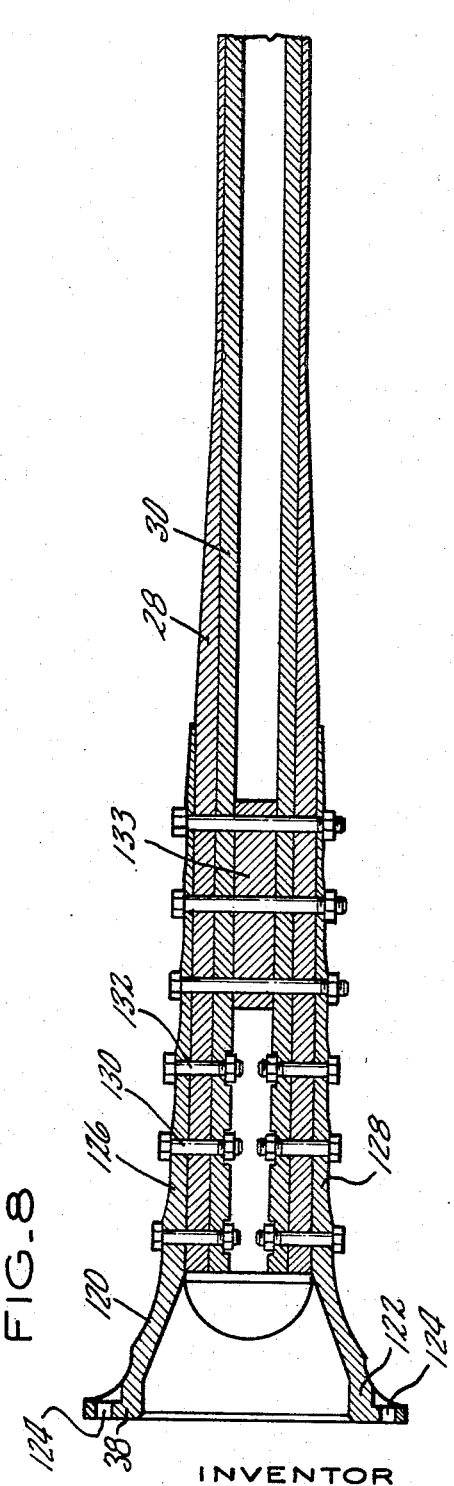
INVENTOR
ROBERT M. KEE
BY *Vernon F. Hauschild*
ATTORNEY

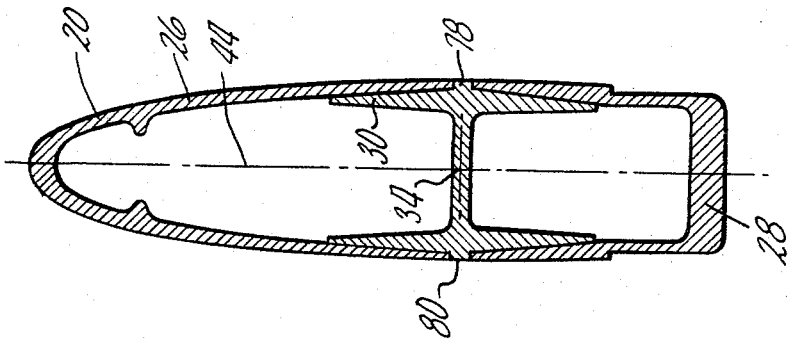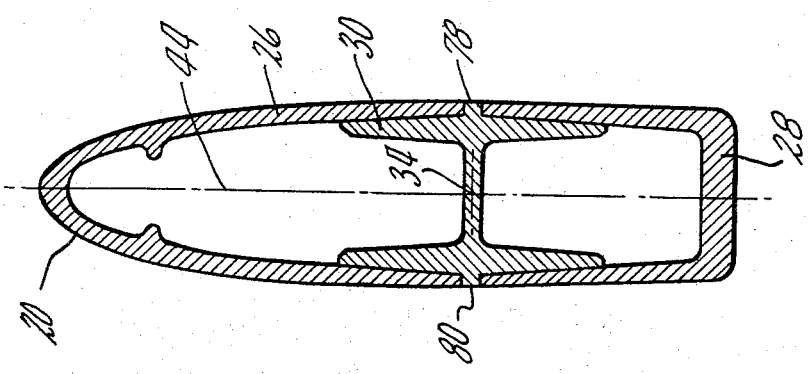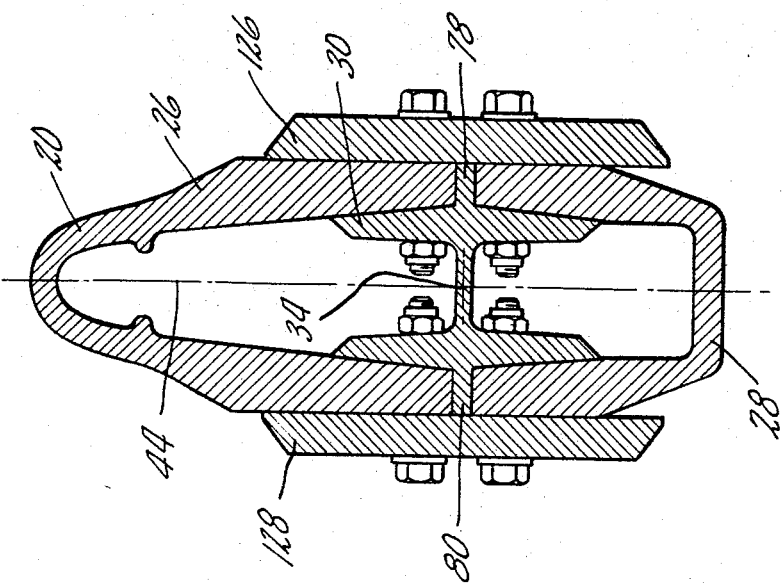

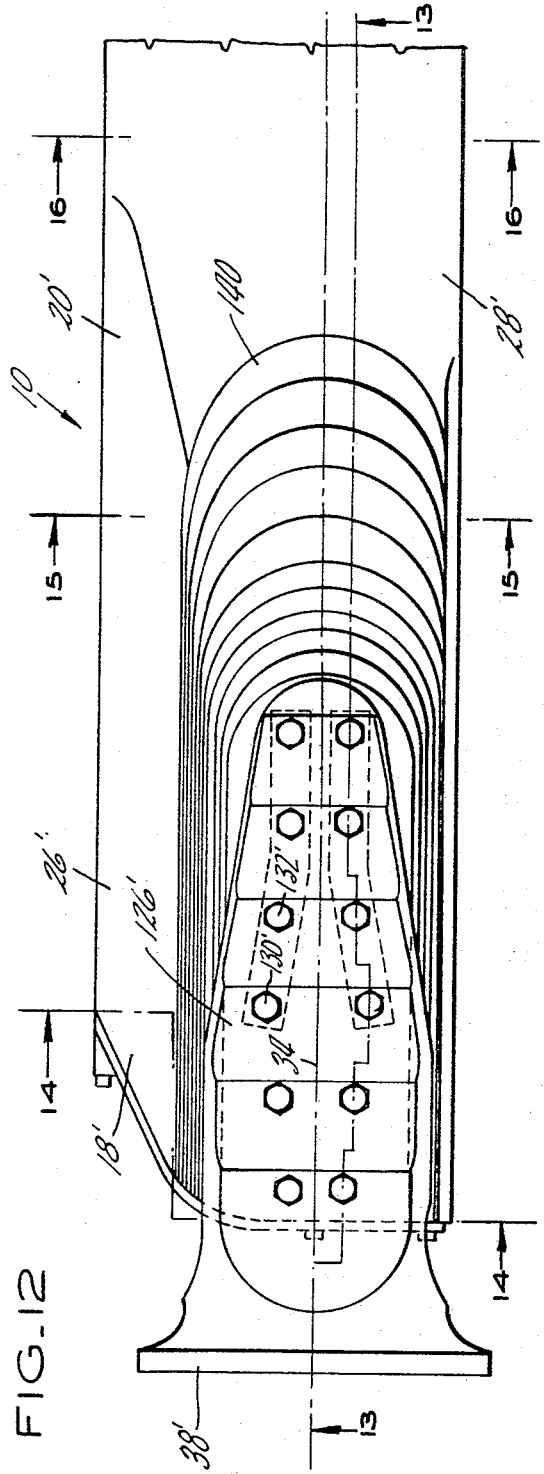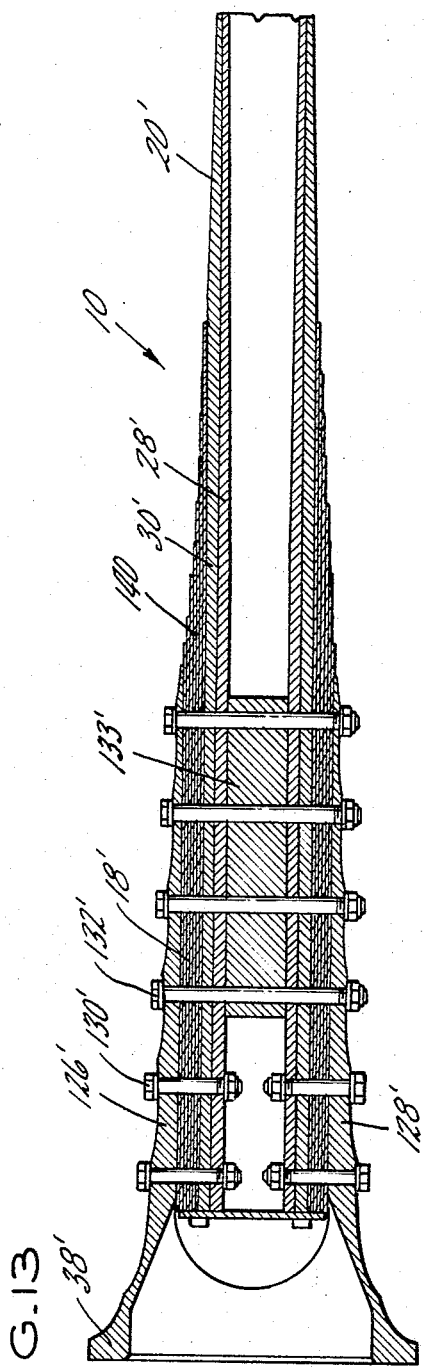

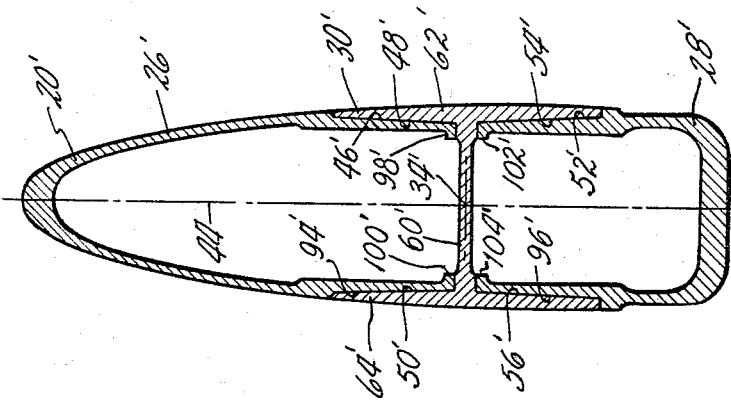
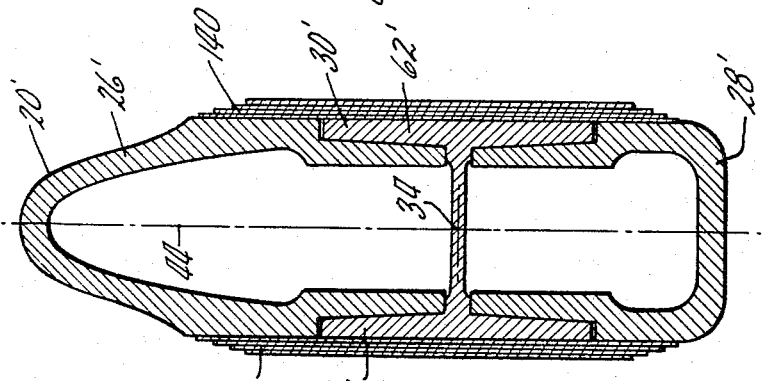
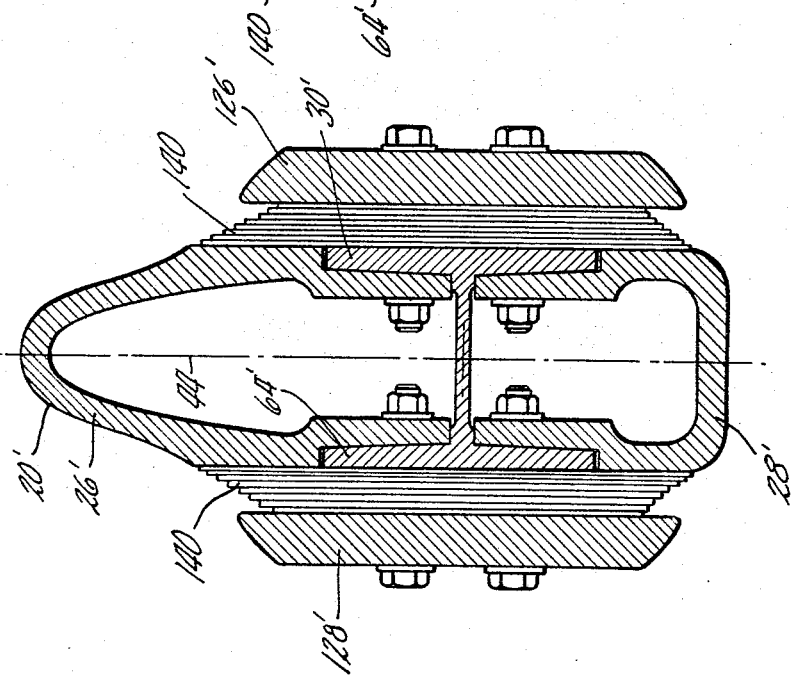

United States Patent Office 3,333,642
Patented Aug. 1, 1967

3,333,642
HELICOPTER BLADE OR BLADE SPAR CONSTRUCTION
Robert M. Kee, Stratford, Conn., assignor to United Aircraft Corporation, East Hartford, Conn., a corporation of Delaware
Filed July 26, 1965, Ser. No. 474,598
21 Claims. (Cl. 170—159)

This invention relates to helicopter blades and more particularly to modern helicopter blades of large size and to a helicopter blade construction which is redundant or multipieced to retard crack propagation.

It is an object of this invention to teach a helicopter blade having a structural spar which is of redundant or multipieced construction comprising a plurality of open, extruded members extending along the span of the blade and presenting substantially flat overlapping surfaces to each other so that the extruded members may be adhesively bonded together throughout the overlapping area of the flat surfaces.

It is a further object of this invention to teach a helicopter blade having a structural spar which comprises first and second extruded members, preferably of channel or C members, and using a third extruded member positioned therebetween and adhesively bonded thereto through substantially flat overlapping surfaces.

It is still a further object of this invention to teach a helicopter blade having a structural spar which includes two spaced channel members which are extrusions and a third extruded member positioned therebetween which is a stepped extrusion to vary in flexibility and strength throughout its length and which is adhesively bonded to the channel members through substantially flat overlapping surfaces.

It is still an important object of this invention to teach a multi-piece helicopter spar or blade wherein several load-carrying members cooperate to form the spar or blade and which members are adhesively bonded to one another by means of an adhesive which has a low modulus.

It is still a further object of this invention to teach a helicopter blade having a structural spar in which the aforementioned third member is shaped in cross section as an I positioned symmetrically about the 25% chord line of the blade and which I member includes a central web extending perpendicular to the blade chord. The central web is attached to spaced flange members extending parallel to the blade chord in overlapping relation to the aforementioned channel members for adhesive bonding thereto and wherein said flange members include strengthening and crack-retarding beads along the periphery thereof and further wherein said I member is of maximum stiffness and strength at the blade root.

It is still a further object of this invention to teach a helicopter blade having a multipiece spar including three extruded members extending along the span of the blade and adhesively bonded together through substantially flat overlapping surfaces and shaped to form the blade leading edge, and further including a plurality of individual, non-structural pockets or fairings attached to the spar along the span of the blade and shaped to cooperate therewith in defining the blade airfoil so as to have a particular chord dimension and with the feathering axis of the blade at the 25% chord of the blade, and further including non-structural counterweights positioned within the spar to counterbalance the non-structural pockets or fairings about the feathering axis.

It is still a further object of this invention to teach a helicopter blade having a structural spar including two extruded channel members adhesively bonded through substantially flat surfaces to an I-shaped member positioned therebetween and positioned symmetrically about the blade feathering axis and the 25% chord line of the blade. The blade further includes non-structural pockets attached to the spar aft of the 25% chord line which cooperate with said spar to define the blade airfoil and also includes non-structural counterweights positioned within said spar forward of the 25% chord line to counterbalance the non-structural pockets thereabout and wherein the I member is a stepped extrusion presenting a thickened portion at the blade root to which blade root attachment means are connected and which also includes a tip projection extending beyond the channel members to which various blade tip caps may be attached.

It is a further object of this invention to teach a helicopter blade having a structural spar comprising a plurality of extruded members adhesively bonded together through substantially flat overlapping surfaces so as to form an artificial plastic enclave therebetween so as to retard crack propagation therebetween.

It is still a further object of this invention to teach a helicopter blade having a structural spar comprising a plurality of extruded members, each of which is open to provide ease of manufacture and inspection and to permit close machining tolerances for good fits therebetween.

As modern helicopters are required to lift greater weight in either cargo or passenger load, it has become necessary to devise ways of increasing the size of the helicopter blades. It is imperative, however, that there be provisions in these large size blades to prevent or retard crack propagation. While it might be desirable to make a single piece helicopter blade, and extrudable materials such as aluminum exhibit characteristics desired in helicopter blades, there is a definite limit to the size of a single piece, extruded blade because all current extrusion presses have dimensional limitations which produce both chordwise and spanwise limits on a one-piece extruded helicopter blade. Effort has been expended to make much larger helicopter and propeller blades from several extruded pieces which are joined together to produce greater blade chord and span; however, the problem of crack propagation in helicopter blades persists.

In the past, several attempts have been made to increase blade or spar size by using multipiece constructions, but none are fully satisfactory. For example, the various pieces of the multipiece blade have been welded together as in U.S. Patents Nos. 2,493,139 and 2,506,992 but a weld connection provides no deterrent to crack propagation. Other multipiece blades or spars have been bolted together as in U.S. Patent No. 2,574,980 but the bolt connection is a source of crack creation. Still other multipiece blades or spars have been joined by a snap action interlock as in U.S. Patent No. 3,093,219 but such interlocks are difficult to manufacture and require close machining tolerances and cause crack creating galling of the metal during the locking and unlocking operation.

It is an object of this invention to teach a multipiece spar for helicopter blades made of a plurality of extruded members which are load carrying members extending for substantially the full spar span and adhesively bonded together along substantially flat, overlapping joints. These load carrying members which extend for substantially the full blade or spar span provide the advantage that failure of one such load carrying member in flight is not catastrophic because the remaining load carrying members can carry the blade load at least for a sufficient time to permit the helicopter to land. This is the significance of the term "redundant" construction.

Other objects and advantages will be apparent from the specification and claims and from the accompanying drawings which illustrate an embodiment of the invention.

Figure 3:
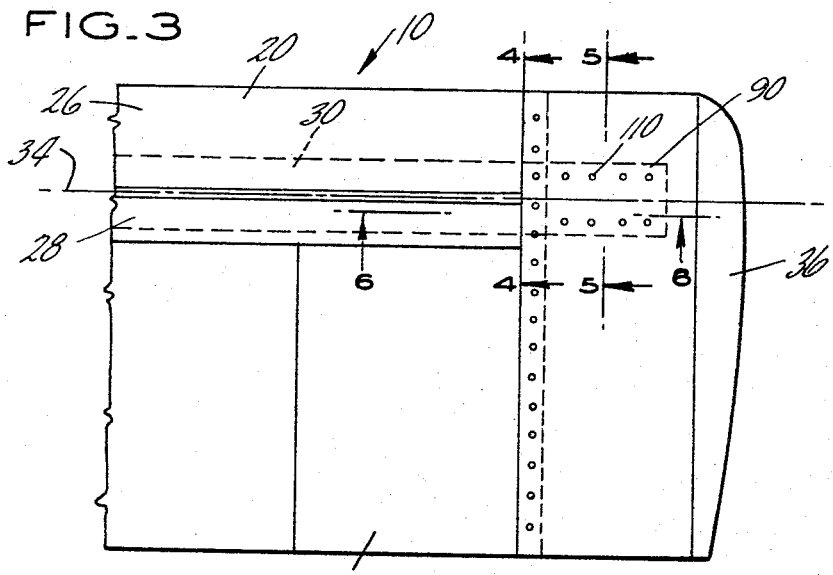
FIG. 3 is a showing of the tip of my blade to illustrate how the tip cap is attached to my spar.
Figure 4:
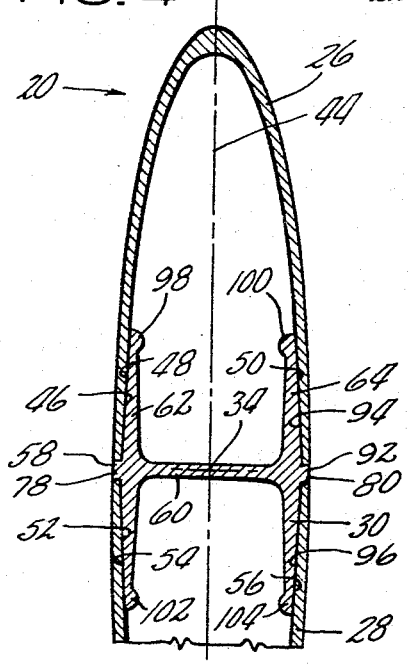
Figure 5:
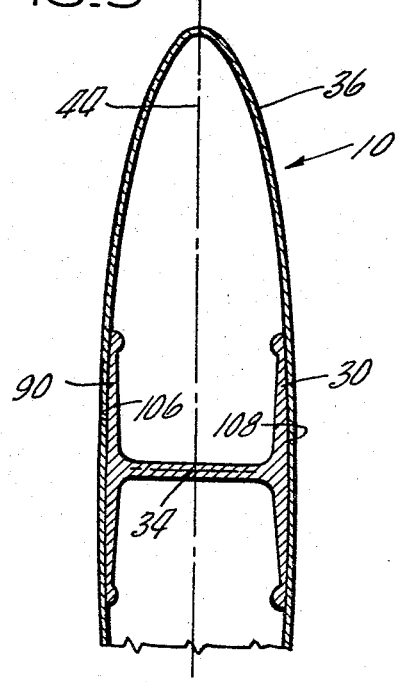
Figure 6:
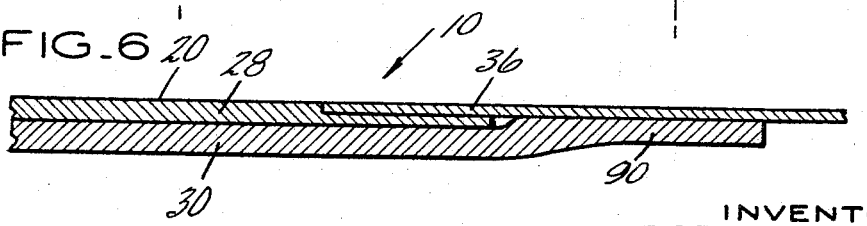

FIG. 4 is a view taken along line 4—4 of FIG. 3.
FIG. 5 is a view taken along line 5—5 of FIG. 3.
FIG. 6 is a view taken along line 6—6 of FIG. 3.
FIG. 7 is a view of a portion of my helicopter blade.
FIG. 8 is a view taken along line 8—8 of FIG. 7.
FIG. 9 is a view taken along line 9—9 of FIG. 7.
FIG. 10 is a view taken along line 10—10 of FIG. 7.
FIG. 11 is a view taken along line 11—11 of FIG. 7.
FIG. 12 is a side view of another embodiment of my helicopter blade.
FIG. 13 is a view taken along line 13—13 of FIG. 12.
FIG. 14 is a view taken along line 14—14 of FIG. 12.
FIG. 15 is a view taken along line 15—15 of FIG. 12.
FIG. 16 is a view taken along line 16—16 of FIG. 12.
FIG. 17 is a cross-sectional view of another embodiment of my helicopter rotor blade.
FIG. 18 is a view illustrating the theory behind the crack propagation retardation which my helicopter rotor blade construction accomplishes.

Figure 1:
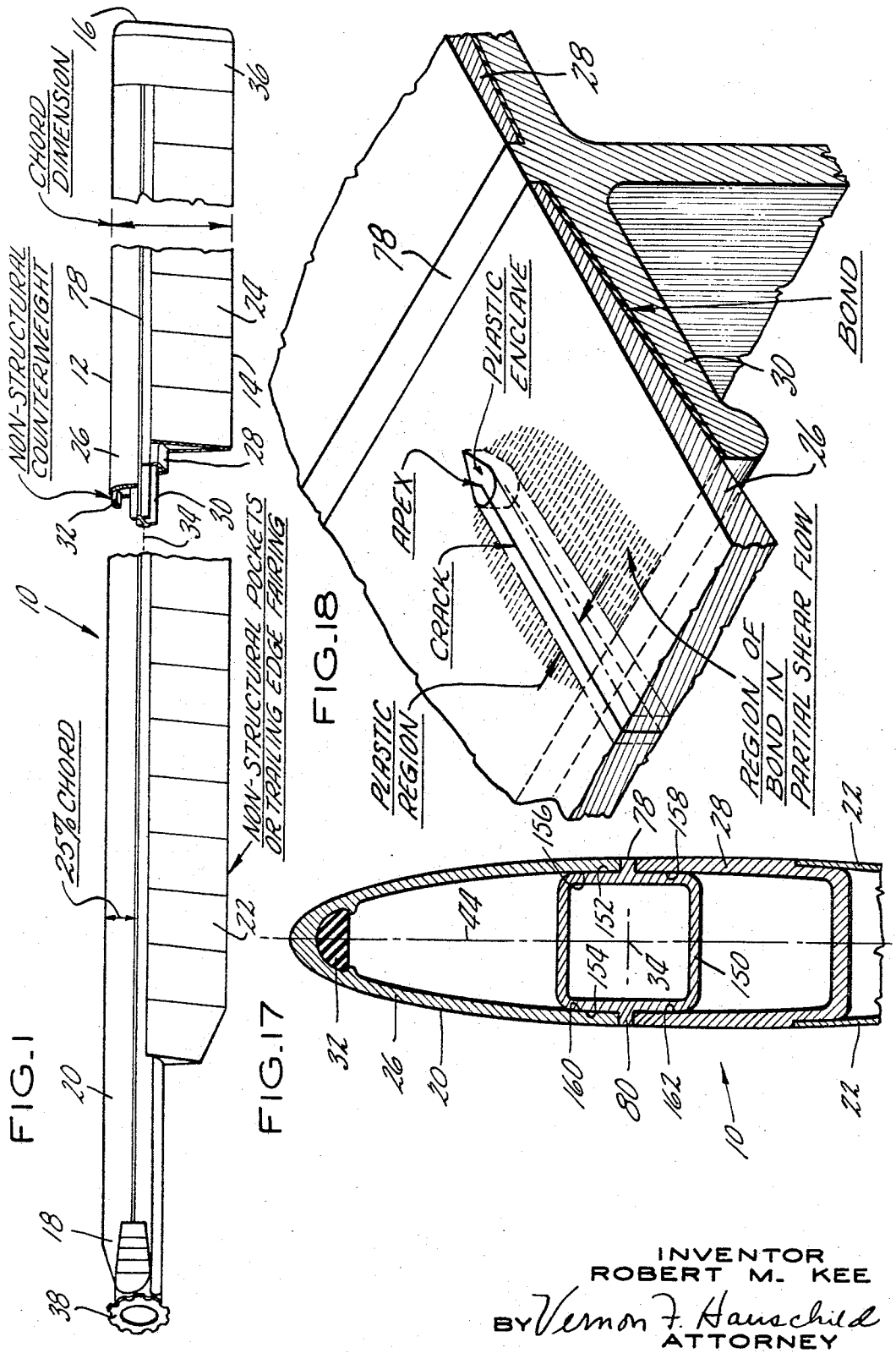
FIG. 1 is a perspective showing of my helicopter rotor blade, partially broken away to reveal some of the inner structure.

Referring to FIG. 1 we see my helicopter rotor blade 10 which has a leading edge 12, a trailing edge 14, a tip end 16 and a root end 18. The span of the blade extends between root end 18 and tip end 16, while the chord dimension extends between leading edge 12 and trailing edge 14. My helicopter blade 10 consists basically of a structural spar 20 which extends for substantially the full span dimension of the blade between root end 18 and tip end 16 and of a plurality of separate, non-structural pockets 22 or trailing edge fairings 22 of the type taught in U.S. Patent No. 2,469,480 to I. I. Sirkorsky and which are individually adhesively bonded to structural spar 20. Structural spar 20 is shaped to form the front, forward or leading portion of an airfoil while non-structural pockets 22 are shaped to form the after, rearward, or trailing edge of an airfoil and each cooperates with the other to define airfoil 24 of blade 10. As can be seen by viewing the broken away portion of FIG. 1, structural spar 20 is basically of three-piece construction including front or leading C-shaped or channel member 26, back, after or trailing channel member 28 and central member 30. Non-structural pockets 22 attach to back channel member 28.

It is an important teaching of my invention that my blade 10 be balanced about the blade feathering axis which is the 25% chord of blade 10. This is accomplished by symmetrically centering central spar member 30 about 25% chord line and by providing non-structural counterweights 32 within front channel member 26 so as to counterbalance non-structural pockets 22 about 25% chord line 34.

In a fashion to be described in greater particularity hereinafter, channel members 26 and 28 are adhesively bonded to central member 30.

Tip cap 36 is attached to central member 30 of spar 20 in a fashion described in greater particularity hereinafter and blade root attachment means 38 is attached to the root end 18 of structural spar 20 and more particularly to central member 30 thereof at 25% chord line 34.

Figure 2:
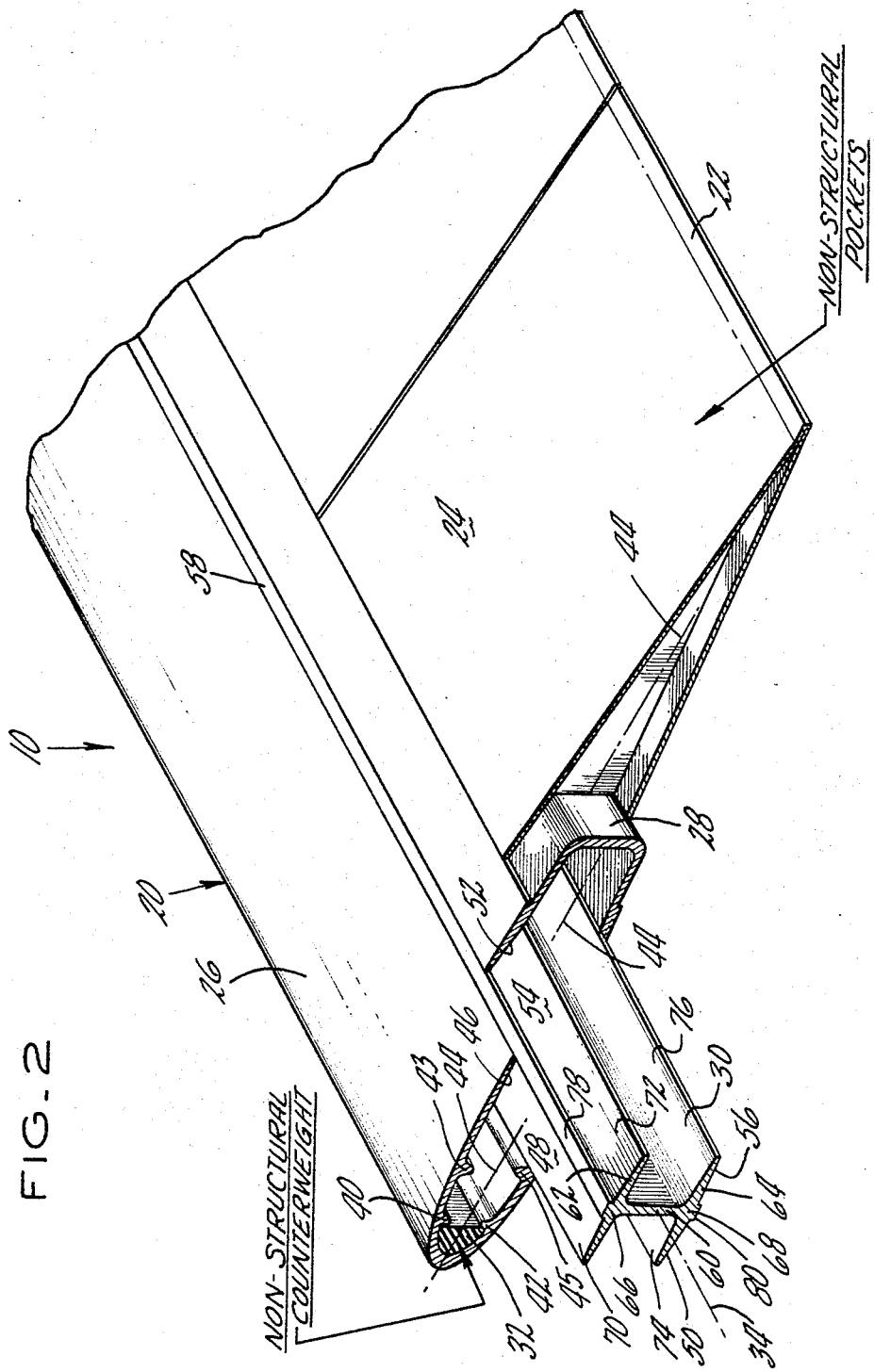
FIG. 2 is an enlarged showing of the broken away portion of FIG. 1.

The details of my blade 10 are shown in greater particularity in FIG. 2. It will be noted by viewing FIG. 2 that front channel member 26 includes opposed strengthening ribs 40 and 42 extending along the span dimension thereof which may be adapted to assist in retaining non-structural counterweights 32 in position. Additional strengthening ribs 43 and 45 may be used at desired stations in all constructions. Non-structural counterweights may be of the bonded type more fully described in U.S. patent application Ser. No. 429,408 or of the type more fully disclosed and described in U.S. Patent No. 2,754,917.

Front channel member 26 is symmetric about chord 44 and is positioned forward of 25% chord line 34. Front channel or C-shaped member 26 presents two internal, opposed, substantially flat surfaces, one of which is shown at 46 which is substantially parallel to chord 44 and which overlaps a similar substantially flat, exterior surface 48 of central member 30. The overlapping area defined by surfaces 46 and 48 will be adhesively bonded to join surface 46 to surface 48 and accordingly to join front channel 26 to central member 30. It should be borne in mind that there is a second surface corresponding to surface 46 on the opposite side of chord 44 of front channel 26 which is adhesively bonded to substantially flat, external surface 50 of central member 30.

Still viewing FIG. 2 it will be noted that back channel member 28 is positioned aft of 25% chord line 34 and is symmetric about chord 44 and presents two opposed, substantially flat, interior surfaces substantially parallel to chord 44, one of which may be seen at 52 and which overlaps a similar substantially flat, external surface 54 of central member 30 which is also substantially parallel to chord 44, and surfaces 52 and 54 are adhesively bonded throughout their overlapping area so as to adhesively bond back channel 28 to central channel 30. It should be borne in mind that there is a similar surface on the bottom side of back channel 28 corresponding to surface 52 which is adhesively bonded in like fashion to exterior surface 56 of central member 30.

It will be noted that front and back channel members 26 and 28 are spaced parallel to one another along the blade span to define chordwise gap 58 therebetween.

By viewing FIG. 2 it will be noted that central member 30 is symmetrically centered about 25% chord line 34 and that non-structural counterweights 32 are positioned forward thereof while non-structural pockets 22 are positioned rearward thereof so as to counterbalance one another about 25% chord line 34 which is also the feathering axis of blade 10.

As best shown in FIG. 2 central member 30 is I shaped in cross section and includes web section 60 which extends substantially perpendicular to chord 44 and which is symmetric about 25% chord line 34. Web section 60 attaches to flange section 62 and 64, both of which extend substantially parallel to chord 44 and are symmetrically centered about 25% chord line 34. Flange sections 62 and 64 are thickest at their central portions 66 and 68 and taper smoothly toward their peripheral edges 70, 72, 74 and 76. Positioning lips 78 and 80 project from flange sections 62 and 64, respectively, and fill chordwise gaps 58 and 92 both at the top and bottom of structural spar 20. Positioning lips 78 and 80 are of particular value in positioning front and back channel members 26 and 28 with respect to central member 30 during the adhesive bonding operation therebetween.

An important feature of my invention is that channel members 26 and 28 and central member 30 may be extrusions extending along the full span of blade 10 and adhesively bonded to one another through flat overlapping surfaces so as to form structural spar 20 as a redundant, multipiece spar. Since each of the load carrying members 26, 28 and 30 extends for the full span of blade 10, it will be evident that failure of one such member does not constitute failure of the entire blade because the remaining load carrying members will coact to carry the entire blade load in redundant fashion. Being able to extrude members 26, 28 and 30 is of particular significance in this helicopter blade redundant construction because it permits the use of thickened and therefore more rigid and stronger sections of the various extrusions along the blade span. In addition, an extrusion permits the incorporation of such shapes as strengthening ribs 40 and 42 in front channel member 26 and positioning lips 78 and 80 in member 30. It will also be noted that extruded members 26, 28 and 30 are open members as opposed to closed cylindrical or oval shaped pieces and this is of definite advantage because it permits ready inspection of the parts, assists in the incorporation of non-structural counterweight 32 and allows for the precise machining of such parts as flat surfaces 46 and 52 of channel members 26 and 28 and flat surfaces 48, 50, 54 and 56 of central member 30.

As will be illustrated hereinafter, stepped extrusion processes may be used to fabricate members 26, 28 and 30 so that they are of varying thickness and hence varying rigidity and strength throughout the span dimension.

By referring to FIGS. 1, 2, 7 and 8, it will be noted that each of load carrying members 26, 28 and 30 extend the full spar length, and each is attached directly to blade root attachment means 38, which is, in turn, attached to the helicopter rotor head (not shown) in conventional fashion. It will accordingly be seen that in this construction if any of the load carrying members 26, 28 or 30 should fail, the remaining load carrying members will coact to carry the blade load until the aircraft can be landed. This is the advantage of the multi-piece spar or blade and this is why it is referred to as the redundant spar or blade.

Referring to FIG. 3 we see a top view of my helicopter blade 10 which illustrates how tip cap 36 is attached to spar 20 and non-structural pockets 22. To facilitate tip cap installation central member 30 of spar 20 includes a tip extension 90 which extends spanwise beyond the ends of channel members 26 and 28. Tip cap 36, which can be of conventional design or modified shape such as described in U.S. Patent No. 2,135,700, is sleeved over tip extension 90 of central member 30 and is also sleeved over structural spar 20 and nonstructural pocket 22 and is attached thereto in conventional fashion, for instance, by bolting or riveting as at 110, so that tip cap 36 may be removed for internal inspection of blade 10.

Referring to FIG. 4 we see a cross-sectional showing through spar 20 to illustrate the construction of front channel member 26, back channel member 28 and central member 30 at station 4—4 of FIG. 3. It will be noted that positioning lips 78 and 80 are positioned in chordwise gaps 58 and 92 between front and back channel members 26 and 28. It will further be noted by viewing FIG. 4 that opposed, internal surfaces 46 and 94 of front channel member 26 are substantially flat and parallel to chord 44 and overlap opposed, external surfaces 48 and 50 of central member 30, which surfaces are also substantially flat and parallel to chord 44 and abut against and are adhesively bonded to corresponding surfaces 46 and 94 of front channel member 26. Still viewing FIG. 4 it will be noted that back channel member 28 includes substantially flat, opposed, internal surfaces 52 and 96 which are substantially parallel to chord 44 and which overlap opposed, external surfaces 54 and 56 of central member 30, which are also substantially flat and parallel to chord 44. Surfaces 52 and 54 are adhesively bonded together as are surfaces 56 and 96. In this fashion, members 26, 28 and 30 of spar 20 are adhesively bonded together through flat overlapping abutting surfaces and thereby produce a redundant, multipiece spar of substantial chord dimension and with the important feature of crack propagation retardation due to the bonding connection between the flat overlapping surfaces. The theory of this crack propagation retardation will be discussed hereinafter.

To ensure that all the bonding surfaces will properly mate, a wet towel test is performed before the bonding operation. A paper towel with a dimpled surface is wetted and squeezed between the substantially flat, overlapping bonding surfaces of the spar pieces 26, 28 and 30. This specimen is then dried in an oven after which the pieces are separated and the papers are examined. Where the dimpled surfaces have been pressed flat, the surfaces will properly mate.

It has been found in practice that crack propagation retardation can be enhanced by fabricating central member 30 so that strengthening beads 98, 100, 102 and 104 extend continuously along the periphery of flange sections 62 and 64 of central member 30.

By viewing FIG. 5 we see my helicopter rotor blade 10 at station 5—5 of FIG. 3. FIG. 5 illustrates tip extension 90 of central member 30 in cross section and shows that positioning lips 78 and 80 are not included on extension 90 but rather that substantially flat surfaces 106 and 108 are presented by tip extension 90 and which extend substantially parallel to chord 44 and over which tip cap 36 is sleeved for attachments thereto, for example, by bolts such as 110 illustrated in FIG. 3.

Referring to FIG. 6 we see a view of my helicopter rotor blade 10 taken along station 6—6 of FIG. 3 to illustrate the overlapping connection between tip cap 36 and spar channel member 28 and to show how tip extension 90 projects from central member 30. A similar stepped connection exists between tip cap 36 and front channel member 26.

Referring to FIGS. 7–11, we see the details of structural spar 20 of my helicopter blade 10 in greater particularity including front channel member 26, central member 30 and back channel member 28.

Referring to FIG. 7, it will be noted that central member 30 is symmetrically centered about 25% chord line or feathering axis 34 and that blade root attachment means 38 is connected to spar 20 symmetrically centered about 25% chord line or feathering axis 34. As best shown in FIGS. 7 and 8, blade root attachment means 38 consists of substantially cylindrical cuff 120 which has peripheral flange 122 thereabout and including bolt holes 124. By bolting action, blade 10 is attached to the helicopter rotor in conventional fashion through blade attachment means 38. Blade root attachment means 38 is bifurcated to present allochiral attaching arms 126 and 128 which project along the spun of structural spar 20 on opposite sides thereof and attached thereto by bolt and nut arrangements such as 130 and 132 so that each load carrying members 26, 28 and 30, as best shown in FIGS. 1, 7 and 8 is attached directly to blade root attachment means 38 and hence to the helicopter rotor. If desired, seal 133, of the type fully described in U.S. Patent No. 3,168,144 may be used.

Referring to FIGS. 9–11 we see cross-section views of structural spar 20 through stations 9—9, 10—10 and 11—11 of FIG. 7. It will be noted by viewing these figures that channel members 26 and 28 and central member 30 are extruded in stepped fashion so as to be thickest and hence strongest and most rigid at blade root end 18 and gradually reduce in thickness toward blade tip end 6 until they are eventually fabricated as shown in FIGS. 4 and 5 at blade tip end 16. It will be noted that in the blade construction shown so far, central member 30 is positioned within channel members 26 and 28 and includes positioning lips 78 and 80 extending therebetween.

Now referring to FIGS. 12–16 we see another embodiment of my helicopter blade 10 and more particularly to the structural spar 20 thereof. The reference numerals used in describing this FIG. 12–16 modification will correspond to the reference numerals already used but with a prime notation added thereto. Blade root attachment means 38' is attached to the root end 18' of structural spar 20' symmetrically centered about 25% chord line 34 in the fashion previously described wherein arms 126' and 128' attach to members 26', 30' and 28' through conventional nut and bolt arrangements 130' and 132'. It will be noted in this construction that shim arrangement 140' as positioned between spar 20' and blade root attachment means 38'. It will also be noted that the construction shown in FIGS. 12–16 differs from the construction shown in the earlier figures in that central member 30' includes flange sections 62' and 64' which are positioned outside of channel members 26' and 28'. Otherwise, this modification of my blade 10 is similar to the modification previously described.

By viewing FIG. 16, we will consider the FIG. 12–16 modification in greater particularity but it should be borne in mind that the description relative to FIG. 16 is equally applicable to the remainder of FIGS. 12–16. As shown in FIG. 16, members 26′, 28′ and 30′ are symmetric about chord 44 and centrally symmetric about 25% chord line of feathering axis 34. Web section 60′ of central member 30′ extends substantially perpendicular to chord 44 and is symmetrically centered about 25% chord line or feathering axis 34 and attaches to flange section 62′ and 64′ which extends substantially parallel to chord 44 outside of channel members 26′ and 28′. Channel member 26′ presents substantially flat, opposed, external surfaces 46′ and 94′ which are substantially parallel to chord 44. Back channel member 28′ presents substantially flat, opposed, external surfaces 52′ and 96′ which are also substantially parallel to chord 44. Central member 30′ presents substantially flat surfaces 48′, 50′, 54′ and 56′ which are also substantially parallel to chord 44 and which overlap the corresponding surfaces 46′, 94′, 52′ and 96′ of members 26′ and 28′, respectively and are adhesively bonded thereto throughout the overlapping areas.

In the construction shown in FIGS. 12–16, non-structural pockets 20 are attached to back channel member 28′ and non-structural counterweights 32 are attached to front channel member 26′ in the fashion described in connection with the FIGS. 1–11 construction.

By viewing FIGS. 14–16 it will be noted that members 26′, 28′ and 30′ are of thickened dimension and hence maximum strength and rigidity adjacent blade root end 18′ where these load carrying members 26′, 28′ and 30′ attach directly to blade root attachment means 38′ and of decreasing dimensional thickness and hence strength and rigidity toward the blade tip end 16. As shown in FIG. 16, strengthening beads 98′, 100′, 102′ and 104′ may extend along the periphery of members 26′ and 28′ for crack propagation retardation purposes.

Referring to FIG. 17 we see another embodiment of my blade 10 which includes a front channel member 26 and a rear channel member 28 positioned symmetrically about chord 44 and including non-structural pockets 22 and non-structural counterweights 32 similar to the constructions previously described. It will be noted that the FIG. 17 embodiment differs from the earlier embodiments in that the central member 150 is not of I cross section but is of either square or rectangular cross section and would vary in dimension along with members 26 and 28 between the blade root end 18 and the blade tip end 16 so as to present maximum thickness and hence maximum strength and rigidity for attachment to blade root attachment means of the type identified as 38 in FIG. 7. It will be noted that the central member 150 of FIG. 17 is symmetric about chord 44 and symmetric about 25% chord line or feathering axis 34. Central member 150 presents substantially flat, external surfaces 152 and 154 which are substantially parallel to chord 44 and overlap corresponding interior surfaces 156, 158, 160 and 162 of members 26 and 28, which corresponding surfaces are also substantially flat and parallel to chord 44. Surfaces 152–162 are adhesively bonded together so as to form a redundant or three piece spar 20.

While there are several types of adhesive bonding materials which would be adequate for bonding sections 26 and 28 to sections 30 or 150, by way of example, Minnesota Mining & Manufacturing Company adhesive bonding agent AF–41 is hereby referred to as appropriate.

As previously mentioned, it is an important teaching in my blade construction that crack propagation between spar parts be retarded and this is the function served by the adhesive bonding through the substantially flat surfaces of the spar pieces as previously described. The theory behind this crack propagation retardation is best described by referring to FIG. 18 wherein a crack having an apex at a bonded joint is illustrated. A plastic enclave of more or less tear drop shape is formed in the highly stressed area about the apex of the crack and moves therewith as the crack propagates so as to leave a plasticly deformed region therebehind. The deformation within this plastic enclave absorbs a portion of the energy which would otherwise propagate the crack. The plastic enclave is formed because the spar material is a homogeneous, semi-isotropic medium such as aluminum. At the bonded joint the plastic enclave and crack cause shear deformation or shear strain, and an associated shear stress, in the adjacent adhesive. The adhesive used to bond the spar members together must be a low shear modulus adhesive which attenuates shear stress as it is transmitted through the layer of the adhesive to the adjoining member. A high modulus adhesive translates a high shear stress more directly to the adjoining member. Such direct transfer of stress into the adjoining member tends to immediately initiate a crack which propagates with the crack in the first member. In effect, the high modulus adhesive makes a homogeneous unit of the disjointed members through which a crack will propagate at the same rate as though it were a one-piece spar. The shear deformation of a low modulus adhesive adjacent to the plastic enclave and crack is approximately the same but the associated shear stress is much lower and the attenuation of the stress is greater due to the shear deformation within the adhesive layer. In effect, the low modulus adhesive acts as an artificial plastic enclave which absorbs energy that would otherwise propagate the crack. The adjoining member, therefore, does not experience as high a shear stress as it would with a high modulus adhesive and consequently a crack is not immediately initiated. Accordingly, when one crack propagating through a channel member reaches a bonded joint, it will not simultaneously initiate a crack in the adjoining member. Thusly, crack propagation through the spar is retarded.

The low shear modulus adhesive has the characteristic that as the fatigue crack propagates through one of the load carrying members and toward the adhesive bond between adjacent load carrying members, the adhesive gives way in the region of high stress at the apex of the fatigue crack. This "giving way" can be either elastic, through the use of low modulus material in thick enough sections so that a shear gradient exists across the adhesive section or, the adhesive itself may actually fail in shear leaving an unbonded section directly under and radiating away from the fatigue crack. In either case, whether the adhesive fails in shear or a shear gradient is created across the adhesive section, the effect is the same. The small, intensively stressed plastic zone at the apex of the propagating metallic fatigue crack in the first load carrying blade or spar member is not felt in or at the same intensity in the adjacent metallic load carrying member. The adhesive literally spreads the load felt by the adjacent metallic load carrying blade or spar member. By so adhesively joining two metallic load carrying members of a helicopter blade or spar, a spreading out of the load distribution at the apex of the propagating fatigue crack is achieved. By reducing the effective sharpness of the crack, i.e., "blunting" the fatigue crack a reduced rate of fatigue crack propagation is achieved by retardation of the motion of the fatigue crack in the area of the adhesive bond between the metallic load carrying members.

With this reduced crack propagation rate, cracks which do occur in helicopter blades may be visually detected during routine inspections, which inspections need take place only after extended intervals, and will not create catastrophic failures.

It is considered highly desirable that blade 10 include non-structural pockets 22 as opposed to structural trailing edge fairings because cracks will not form in the non-structural pockets since they are not load carrying members, as are members 26, 28 and 30. In addition, a lighter counterweight 32 is required to counterbalance the light, non-structural pockets 22 than would be the case if structural fairings were substituted therefor. Still further, the substitution of structural fairings would increase the overall blade weight.

Some of the structure disclosed and claimed herein is disclosed in U.S. patent application Ser. No. 429,408, filed Feb. 1, 1965, on improvements in Bonded Counterweight for Blade of Rotary Wing Aircraft, by Longobardi et al.

It is an important feature of my invention that the bonding material used to adhesively bond together the spar members such as 26, 28 and 30 have a low modulus of elasticity to produce optimum crack propagation retardation. Preferably, the bonding material should have a modulus of elasticity between fifty thousand (50,000) and one hundred and fifty thousand (150,000) pounds per square inch (p.s.i.). The purpose of using a low modulus adhesive is the fact that low modulus adhesives exhibit a large capaicty for strain or deformation compared with that of a high modulus adhesive. Accordingly, a low shear modulus adhesive has high energy absorption capacity, whereas, a high shear modulus adhesive does not.

In addition, it is preferred that the bonding material have a thickness of about .010″. A good thickness range for the bonding material would be a .010±.002″. The importance of the use of an adhesive having a low modulus is that such an adhesive has high energy absorption capacity and this high energy absorption capacity of the low modulus adhesive gives it crack propagation arrest capability.

It is to be understood that this invention is not limited to the specific embodiment herein illustrated and described but may be used in other ways without departure from its spirit as defined by the following claims.

I claim:

1. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having at least three extruded members extending throughout the blade span and including a first channel member extending along the blade leading edge and opening toward said blade trailing edge to present two substantially flat surfaces, a second channel member positioned between said first channel member and said blade trailing edge and opening toward said blade leading edge to present two substantially flat surfaces, a third member positioned between said first and second channel members and shaped to present substantially flat surfaces overlapping said substantially flat surfaces of said first and second channel members and being adhesively bonded thereto with a low shear modulus adhesive.

2. Apparatus according to claim 1 wherein said third member is centered about the 25% chord line of said blade.

3. Apparatus according to claim 2 and including non-structural counterweights positioned within the interior of said first member and positioned to serve as counterweights about said 25% chord line for said non-structural pockets.

4. Apparatus according to claim 1 wherein said third member varies in rigidity and strength and is of maximum rigidity and strength at said root.

5. Apparatus according to claim 1 and including a tip cap attached to the tip end of said third member and a blade root attachment means attached to the root end of said third member.

6. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having at least three extruded members extending throughout the blade span and including a first channel member extending along the blade leading edge and opening toward said blade trailing edge to present two substantially flat surfaces extending substantially parallel to said chord dimension, a second channel member positioned between said first channel member and said blade trailing edge and opening toward said blade leading edge to present two substantially flat surfaces extending substantially parallel to said chord dimension, a third member positioned between said first and second channel members and shaped to present substantially flat surfaces extending substantially parallel to said chord dimension and overlapping said substantially flat surfaces of said first and second channel members and being adhesively bonded thereto with a low shear modulus adhesive throughout the overlapping areas.

7. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having three load carrying extruded members extending throughout the blade span and including a first channel member extending along the blade leading edge and opening toward said blade trailing edge to present two spaced substantially flat surfaces extending substantially parallel to said chord dimension, a second channel member positioned between said first channel member and said blade trailing edge and opening toward said blade leading edge to present two spaced substantially flat surfaces extending substantially parallel to said chord dimension, said non-structural pockets being attached to said second channel member, a third member shaped in cross section as an I and positioned between said first and second channel members and including a web section extending substantially perpendicular to said chord dimension and connected to two spaced flange sections which are shaped to present substantially flat surfaces extending substantially parallel to said chord dimension and overlapping said substantially flat surfaces of said first and second channel members and being adhesively bonded thereto with a low shear modulus adhesive throughout the overlapping areas.

8. Apparatus according to claim 7 and wherein said web section of said third member is positioned at the 25% chord line of said blade and wherein said flange sections are centered thereabout.

9. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperataee therewith in forming an airfoil having a chord dimension, said spar having three load carrying extruded members extending throughout the blade span and including a first channel member extending along the blade leading edge and opening toward said blade trailing edge to present two spaced substantially flat surfaces extending substantially parallel to said chord dimension, a second channel member positioned between said first channel member and said blade trailing edge and opening toward said blade leading edge to present two spaced substantially flat surfaces extending substantially parallel to said chord dimension, said second channel member being spaced parallel from said first channel member to form a chordwise gap therebetween, said non-structural pockets being attached to said second channel member, a third member shaped in cross section as an I and positioned between and within said first and second channel members and including a web section extending substantially perpendicular to said chord dimension and connected to two spaced flange sections which are shaped to present substantially flat surfaces extending substantially parallel to said chord dimension and overlapping said substantially flat surfaces of said first and second channel members and being adhesively bonded thereto with a low shear modulus adhesive throughout the overlapping areas, each of said flange sections including a positioning lip projecting therefrom and located in said chordwise gap.

10. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having three load carrying extruded members extending throughout the blade span and including a first channel member extending along the blade leading edge and opening toward said blade trailing edge to present two spaced substantially flat external surfaces extending substantially parallel to said chord dimension, a second channel member positioned between said first channel member and said blade trailing edge and opening toward said blade leading edge to present two spaced substantially flat external surfaces extending substantially parallel to said chord dimension, said non-structural pockets being attached to said second channel member, said second channel member being spaced parallel from said first channel member to form a chordwise gap therebetween, a third member shaped in cross section as an I and positioned between said first and second channel members and including a web section extending substantially perpendicular to said chord dimension and extending through said chordwise gap and connected to two spaced flange sections outside said first and second channel members which are shaped to present substantially flat internal surfaces extending substantially parallel to said chord dimension and overlapping said substantially flat surfaces of said first and second channel members and being adhesively bonded thereto with a low shear modulus adhesive throughout the overlapping areas.

11. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having three load carrying extruded members extending throughout the blade span and including a first channel member extending along the blade leading edge and opening toward said blade trailing edge to present two spaced substantially flat surfaces extending substantially parallel to said chord dimension, a second channel member positioned between said first channel member and said blade trailing edge and opening toward said blade leading edge to present two spaced substantially flat surfaces extending substantially parallel to said chord dimension, a third member shaped in cross section as an I and positioned between said first and second channel members and including a web section extending substantially perpendicular to said chord dimension and connected to two spaced flange sections which are shaped to present substantially flat surfaces extending substantially parallel to said chord dimension and overlapping said substantially flat surfaces of said first and second channel members and being adhesively bonded thereto with a low shear modulus adhesive throughout the overlapping areas, and said flange sections having strengthening beads along the periphery thereof.

12. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having three load carrying extruded members extending throughout the blade span and including a first channel member extending along the blade leading edge and opening toward said blade trailing edge to present two spaced substantially flat surfaces extending substantially parallel to said chord dimension, a second channel member positioned between said first channel member and said blade trailing edge and opening toward said blade leading edge to present two spaced substantially flat surfaces extending substantially parallel to said chord dimension, said second channel member being spaced parallel from said first channel member to form a chordwise gap therebetween, said non-structural pockets being attached to said second channel member, a third member shaped in cross section as an I and positioned between and within said first and second channel members and including a web section extending substantially perpendicular to said chord dimension and located at the 25% chord line of said blade and connected to two spaced flange sections which are shaped to present substantially flat surfaces extending substantially parallel to said chord dimension and overlapping said substantially flat surfaces of said first and second channel members and being adhesively bonded thereto with a low shear modulus adhesive throughout the overlapping areas, each of said flange sections including a positioning lip projecting therefrom and located in said chordwise gap, said third member including a root end of maximum rigidity and strength and a tip extension projecting beyond said first and second channel members, a blade tip cap attached to said third member tip extension and engaging said first and second channel members and one of said non-structural pockets to close off the tip of said blade, and blade root retaining means centered about the blade 25% chord line and engaging said third member root end.

13. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimention, said spar having three load carrying extruded members extending throughout the blade span and including a first channel member extending along the blade leading edge and opening toward said blade trailing edge to present two spaced substantially flat internal surfaces extending substantially parallel to said chord dimension and including strengthening ribs extending spanwise along the inner wall thereof, a second channel member positioned between said first channel member and said blade trailing edge and opening toward said blade leading edge to present two spaced substantially flat internal surfaces extending substantially parallel to said chord dimension, said second channel member being spaced parallel from said first channel member to form a chordwise gap therebetween, said non-structural pockets being attached to said second channel member, a third member shaped in cross section as an I and positioned between and within said first and second channel members and including a web section extending substantially perpendicular to said chord dimension and located at the 25% chord line of said blade and connected to two spaced flange sections which are shaped to present substantially flat external surfaces extending substantially parallel to said chord dimension and overlapping said substantially flat surfaces of said first and second channel members and being adhesively bonded thereto with a low shear modulus adhesive throughout the overlapping areas, each of said flange sections including a positioning lip projecting centrally therefrom and located in said chordwise gap and further having strengthening beads along the periphery thereof, said third member including a root end of maximum rigidity and strength and a tip extension projecting beyond said first and second channel members, a blade tip cap attached to said third member tip extension and engaging said first and second channel members and one of said non-structural pockets to close off the tip of said blade, blade root retaining means centered about the blade 25% chord line and engaging said third member root end, and non-structural counterweights retained in said first channel member interior by said strengthening ribs and positioned to balance said non-structural pockets about said 25% chord line.

14. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having three load carrying extruded members extending throughout the blade span and including a first channel member extending along the blade leading edge and opening toward said blade trailing edge to present two spaced substantially flat surfaces extending substantially parallel to said chord dimension and including strengthening ribs extending spanwise along the inner wall thereof, a second channel member positioned between said first channel member and said blade trailing edge and opening toward said blade leading edge to present two spaced substantially flat surfaces extending substantially parallel to said chord dimension, said non-structural pockets being attached to said second channel member, a third member shaped in cross section as an I and positioned between said first and second channel members and including a web section extending substantially perpendicular to said chord dimension and located at the 25% chord line of said blade and connected to two spaced flange sections which are shaped to present substantially flat surfaces extending substantially parallel to said chord dimension and overlapping said substantially flat surfaces of said first and second channel members and being adhesively bonded thereto with a low shear modulus adhesive throughout the overlapping areas, said third member including a root end of maximum rigidity and strength and a tip extension projecting beyond said first and second channel members, a blade tip cap attached to said third member tip extension and engaging said first and second channel members and one of said non-structural pockets to close off the tip of said blade, and blade root retaining means centered about the blade 25% chord line and engaging said third member root end, and non-structural counterweights retained in said first channel member interior by said strengthening ribs and positioned to balance said non-structural pockets about said 25% chord line.

15. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individually attached to said spar and shaped to cooperate therewith in forming an airfoil having a chord dimension, said spar having three load carrying extruded members extending throughout the blade span and including a first channel member extending along the blade leading edge and opening toward said blade trailing edge to present two spaced substantially flat external surfaces extending substantially parallel to said chord dimension and including strengthening ribs extending spanwise along the inner wall thereof, a second channel member positioned between said first channel member and said blade trailing edge and opening toward said blade leading edge to present two spaced substantially flat external surfaces extending substantially parallel to said chord dimension, said non-structural pockets being attached to said second channel member, said second channel member being spaced parallel from said first channel member to form a chordwise gap therebetween, a third member shaped in cross section as an I and positioned between said first and second channel members and including a web section extending substantially perpendicular to said chord dimension and located symmetrically about the 25% chord line of said blade and extending through said chordwise gap and connected to two spaced flange sections outside said first and second channel members which are shaped to present substantially flat internal surfaces extending substantially parallel to said chord dimension and overlapping said substantially flat surfaces of said first and second channel members and being adhesively bonded thereto with a low shear modulus adhesive throughout the overlapping areas, said third member including a root end of maximum rigidity and strength and a tip extension projecting beyond said first and second channel members, a blade tip cap attached to said third member tip extension and engaging said first and second channel members and one of said non-structural pockets to close off the tip of said blade, and blade root retaining means centered about the blade 25% chord line and engaging said third member root end, and non-structural counterweights retained in said first channel member interior by said strengthening ribs and positioned to balance said non-structural pockets about said 25% chord line.

16. In a helicopter rotor blade having a leading edge, a trailing edge, a root and a tip, a structural spar extending along the blade leading edge and extending spanwise from the root to the tip thereof, a plurality of non-structural pockets forming the blade trailing edge and being individualy attached to said spar and shaped to cooperate therewith in forming an airfoil having a chord dimension, said spar having at least three extruded members extending throughout the blade span and including a first member extending along the blade leading edge and shaped to present two substantially flat surfaces, a second member positioned between said first member and said blade trailing edge and shaped to present two substantially flat surfaces, a third member positioned between said first and second members and shaped to present substantially flat surfaces overlapping said substantially flat surfaces of said first and second members and being adhesively bonded thereto with a low shear modulus adhesive throughout said overlapping surfaces.

17. In a helicopter rotor blade adapted to be connected to a blade root attachment means and having a leading edge, a trailing edge, a root and a tip, a structural member extending spanwise from the root to the tip thereof, said structural member having at least three extruded, load carrying members extending throughous the blade span and each adapted to be connected directly to said blade root attachment means and including a first member extending along the blade leading edge and shaped to present two substantially flat surfaces, a second member positioned between said first member and said blade trailing edge and shaped to present two substantially flat surfaces, a third member positioned between said first and second members and shaped to present substantially flat surfaces overlapping said substantially flat surfaces of said first and second members and being adhesively bonded thereto with a low shear modulus adhesive throughout said overlapping surfaces whereby crack propagation between said load carrying members is abated.

18. In a helicopter rotor blade having a leading edge, a trailing edge, a root and a tip, a structural spar extending along the blade leading edge and extending spanwise from the root to the tip thereof, a fairing member forming the blade trailing edge and being attached to said spar and shaped to cooperate therewith in forming an airfold having a chord dimension, said spar having at least three extruded members extending throughout the blade span and including a first member extending along the blade leading edge and shaped to present two substantially flat surfaces, a second member positioned between said first member and said blade trailing edge and shaped to present two substantially flat surfaces, a third member positioned between said first and second members and shaped to present substantially flat surfaces overlapping said substantially flat surfaces of said first and second members and being adhesively bonded thereto with a low shear modulus adhesive throughout said overlapping surfaces.

19. In a helicopter rotor blade adapted to be connected to a blade root attachment means and having a leading edge, a trailing edge, a root and a tip, a structural spar extending along the blade leading edge and extending spanwise from the root to the tip thereof, a fairing member forming the blade trailing edge and being attached to said spar and shaped to cooperate therewith in forming an airfoil having a chord dimension, said spar having at least three extruded members extending throughout the blade span and each adapted to be connected directly to said blade root attachment means and including a first member extending along the blade leading edge and shaped to present two substantially flat surfaces, a second member positioned between said first member and said blade trailing edge and shaped to present two substantially flat surfaces, a third member positioned between said first and second members and shaped to present substantially flat surfaces overlapping said substantially flat surfaces of said first and second channel members and being adhesively bonded thereto with an adhesive having a modulus of elasticity between 50,000 and 150,000 p.s.i. and a thickness of .010″ adhesively bonding said members together throughout said overlapping surfaces to retard crack propagation between the load carrying members.

20. In a helicopter rotor blade having a leading edge, a trailing edge, a root and a tip, a structural member extending spanwise of the rotor blade, said structural member having at least three load carrying members extending along the blade span and including a first member extending spanwise and positioned between the blade leading edge and the blade trailing edge and shaped to present two substantially flat surfaces, a second member extending spanwise and positioned between said first member and said blade trailing edge and shaped to present two substantially flat surfaces, a third member extending spanwise and positioned between said first and second members and shaped to present substantially flat surfaces overlapping said substantially flat surfaces of said first and second members and being bonded thereto throughout said overlapping surfaces with a bonding agent having high energy absorption capacity to abate crack propagation between said members.

21. In a helicopter rotor blade adapted to be connected to a blade root attachment means and having a leading edge, a trailing edge, a root and a tip, a structural member extending spanwise from the blade root to the blade tip, said structural member having at least three load carrying members extending throughout the blade span and each adapted to be connected directly to said blade root attachment means and including a first member extending along the blade leading edge and shaped to present two substantially flat surfaces, a second member positioned between said first member and said blade trailing edge and shaped to present two substantially flat surfaces, a third member positioned between said first and second members and shaped to present substantially flat surfaces overlapping said substantially flat surfaces of said first and second members and being adhesively bonded thereto throughout said overlapping surfaces.

References Cited
UNITED STATES PATENTS

| | | | |
|---|---|---|---|
| 1,317,032 | 9/1919 | Page | 170—159 |
| 2,981,337 | 4/1961 | Stuart | 170—159 |
| 3,093,219 | 6/1963 | Ramme | 170—159 |
| 3,167,129 | 1/1965 | Shultz | 170—159 |

FOREIGN PATENTS 52,856  7/1942  Netherlands.

MARTIN P. SCHWADRON, *Primary Examiner.*

EVERETTE A. POWELL, JR., *Examiner.*